G. R. CARTER.
LIFTING TRAP.
APPLICATION FILED JAN. 25, 1918.
1,303,636.
Patented May 13, 1919.
3 SHEETS—SHEET 2.
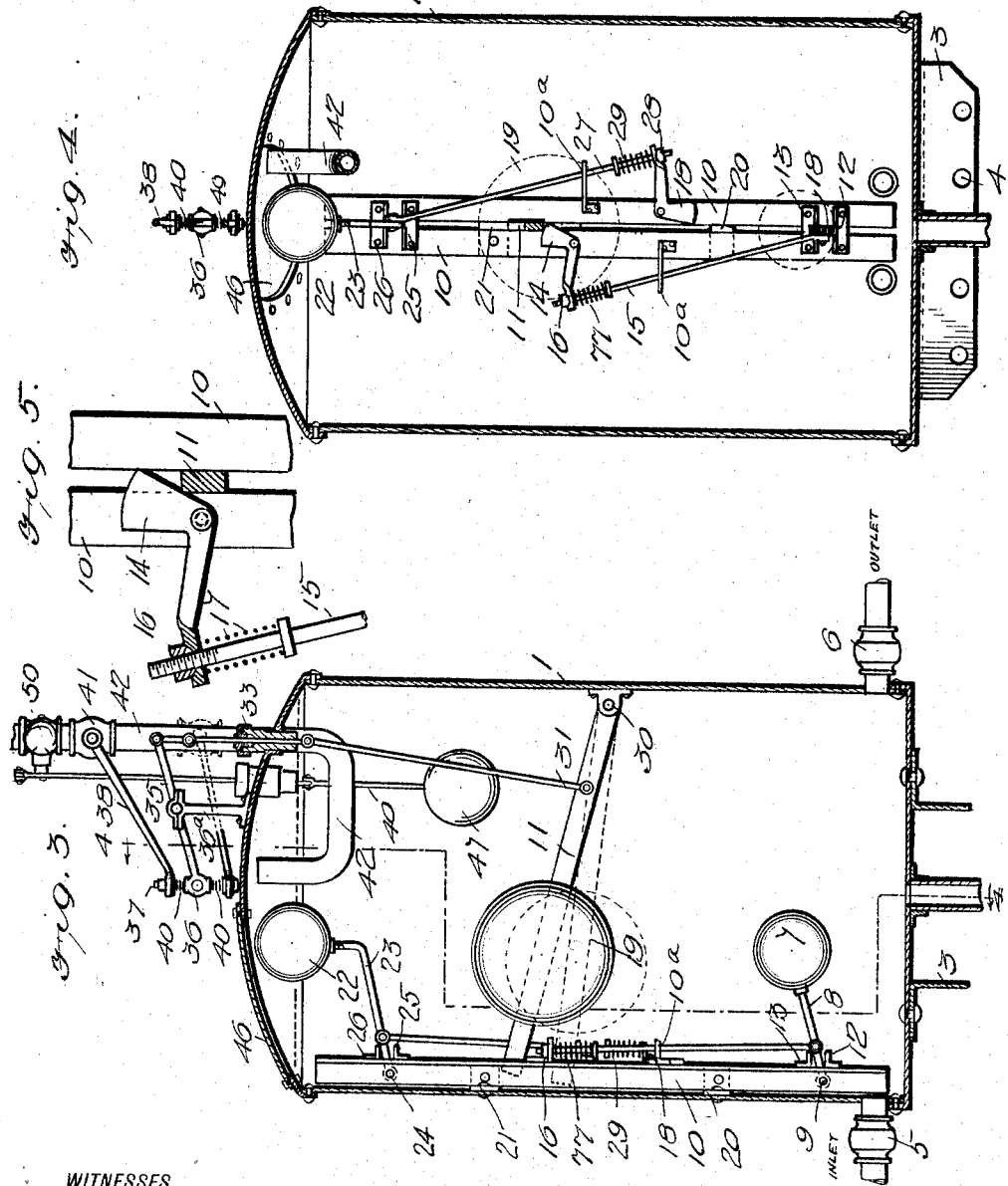
WITNESSES
INVENTOR
George R. Carter
BY
ATTORNEYS G. R. CARTER.
LIFTING TRAP.
APPLICATION FILED JAN. 25, 1918.
1,303,636.
Patented May 13, 1919.
3 SHEETS—SHEET 3.
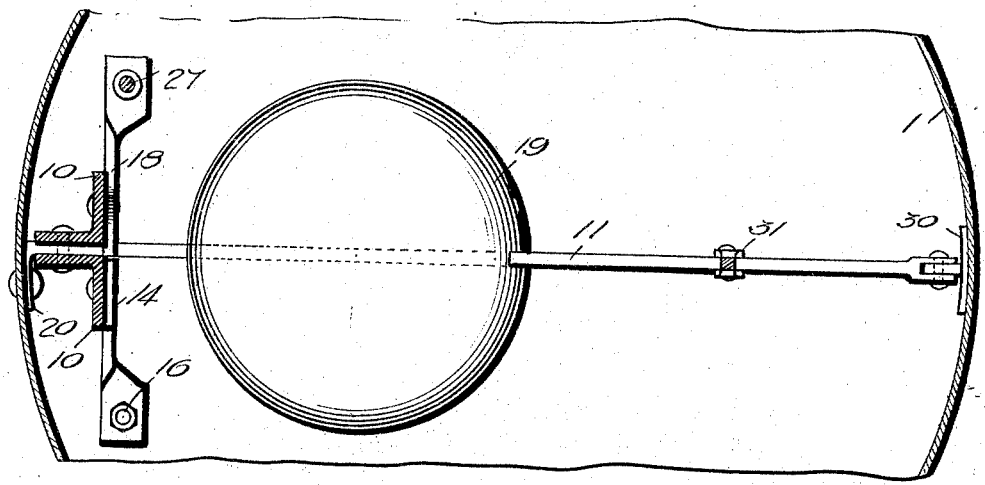
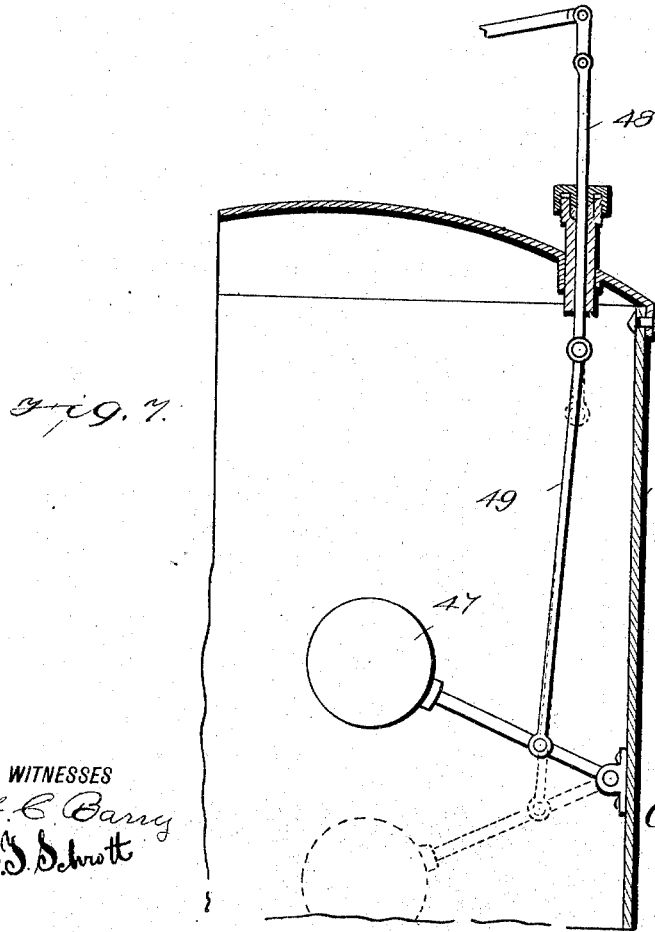
WITNESSES
INVENTOR
George R. Carter
ATTORNEYS June
UNITED STATES PATENT OFFICE.

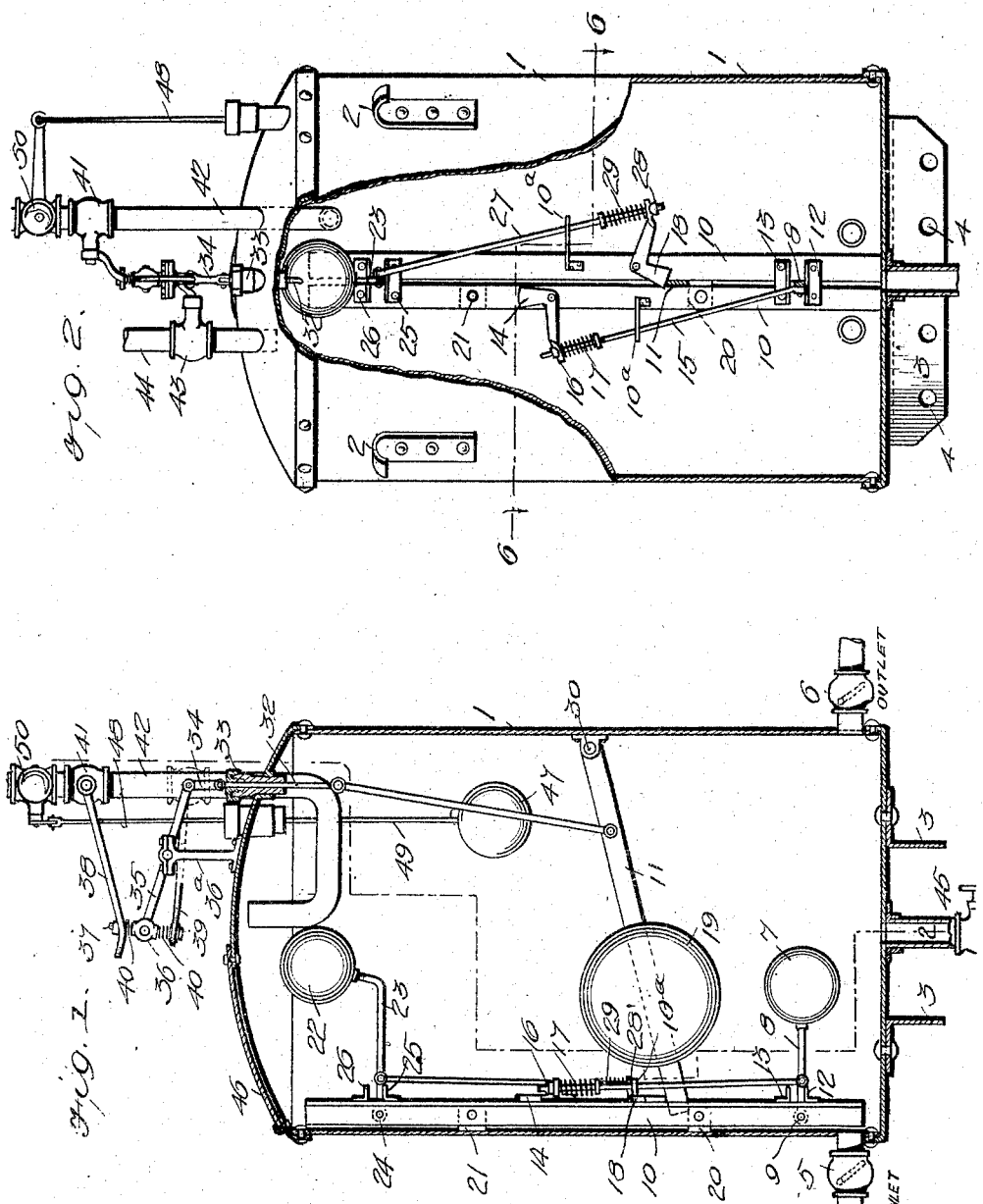

GEORGE RILEY CARTER, OF OKLAHOMA, OKLAHOMA.

LIFTING-TRAP.

1,303,636.  Specification of Letters Patent.  Patented May 13, 1919.

Application filed January 25, 1918. Serial No. 213,828.

*To all whom it may concern:*

Be it known that I, GEORGE RILEY CARTER, a citizen of the United States, and a resident of Oklahoma city, in the county of Oklahoma and State of Oklahoma, have invented certain new and useful Improvements in Lifting-Traps, of which the following is a specification.

My invention relates to improvements in liquid distribution mechanisms, and it consists in the constructions, combination and arrangements herein described and claimed.

An object of my invention is to provide a lifting trap for transferring water, oil or other fluids against any pressure to any height or distance, and in any desired volume, by means of air or steam pressure through the coöperation of certain float controlled mechanisms.

Another object of the invention is to provide a lifting trap for the purpose described, including a plurality of fluid level controlled floats governing the action of certain trigger devices for releasing the master valve shifting float.

Other objects and advantages will appear in the following specification, reference being had to the accompanying drawings in which:

Figure 1 is a vertical section of the lifting trap showing the floats in the normal positions, Fig. 2 is a vertical section taken substantially on the line 2—2 of Fig. 1, Fig. 3 is a section similar to Fig. 1, showing the floats in the elevated positions, Fig. 4 is a vertical section taken substantially on the line 4—4 of Fig. 3, Fig. 5 is a detail section showing one of the trips or triggers, Fig. 6 is a cross section on the line 6—6 of Fig. 2, and Fig. 7 is a detail sectional view showing an automatic cut off hereinafter described.

In carrying out the invention I provide a tank 1 which has a plurality of lifting lugs 2 arranged on the outside near the top, and has a pair of weight brackets 3 on the bottom. These brackets are perforated at suitable intervals as at 4, so that weights may be attached to the bottom of the tank, and the entire trap submerged in a liquid. When the trap is thus submerged, the lifting lugs 2 are used to support the trap and also to again withdraw it when desired.

Arranged at diametrically opposite points at the bottom of the tank 1 are inlet and exhaust valves 5 and 6. These valves may be mechanically operated if it be desired to have them so, or they may be in the nature of the simple check valves illustrated in the drawings. It should be stated that if desired, a number of inlet and exhaust valves may be employed. It is thought unnecessary however to show the arrangement in the drawings, since it will be carried out in a manner well established in practice. The inlet valve 5 opens when the tank 1 is submerged, and the fluid enters the tank.

There are three floats inside of the tank, each one being mounted on a pivoted arm. The rising fluid level inside of the tank, first acts upon the lower float 7, which is mounted upon the end of the arm 8. The arm 8 is pivoted at 9 between a pair of channel irons 10 which are spaced apart as shown in Fig. 2, and form a guide for the end of a master float arm 11.

A float arm rest 12 disposed beneath the arm 8 and bridging the channel irons 10, supports the lower float 7 in the normal position indicated in Fig. 1. A stop 13 disposed above the arm 8 limits the upward movement of the float 7 under the action of the rising fluid level just referred to.

A pair of triggers are pivoted at diametrically opposite sides of the central passage of the master float arm guide 10. The upper one or locking trigger 14 is controlled by the trigger rod 15 which is pivotally secured to the lower float arm 8. The trigger rod 15 has a swivel connection to the arm of the trigger 14 as at 16, in order to compensate for the relative arcuate movements of the arm 8 and the trigger 14. A spring 17 is disposed about the upper end of the rod 15, bearing against the arm of the trigger 14, and a collar on the trigger rod.

As the lower float 7 continues to ascend with the rising fluid level, the trigger rod 15 shoves the locking trigger 14 across the central passage of the guide 10. The trigger 14 is adapted to be displaced against the tension of the spring 17, on the upward movement of the master float arm 11 under the circumstance that will presently be described.

The lower one or releasing trigger 18 normally closes the central passage of the guide 10 to the upward movement of the master float arm 11. The releasing trigger 18 normally engages the end of the arm 11, and thus prevents the master float 19 on the arm 11 from rising with the level of the fluid, when this level reaches and surrounds the master float.

Fixed between the channel irons of the guide 10 is a master float arm stop 20. The stop 20, as is also a second similar member 21, is in the nature of a right angled bracket which offers the means for securing and supporting the guide 10 on the adjacent wall of the tank 1.

An upper float 22 comprises the means through which the master float arm 11 is released from the releasing trigger 18. The float 22 is mounted on the end of a float arm 23 which is pivotally supported at 24 between the channel irons of the guide 10. An arm rest 25 supports the float 22 in the normal position, while a stop 26 limits the upward movement of the arm 23 when the fluid level reaches the upper float.

Connected between the arm 23 and the releasing trigger 18 is a trigger rod 27 which has a swivel connection 28 with the arm of the releasing trigger 18. A spring 29 bears against this arm and a collar on the trigger rod 27. The releasing trigger 18 is capable of being displaced from its position across the central passage of the guide 10, upon the downward movement of the master float arm 11 during a part of a subsequent operation hereinafter to be described.

The fluid level having reached the upper float 22, causes the float to rise and pull upon the arm of the releasing trigger 18, thus causing the trigger 18 to move out of contact with the end of the arm 11. The buoyancy of the float 19 causes it to rapidly rise to the position indicated in Fig. 3, in which position the master float is retained through the engagement of the end of the arm 11 with the upper stop 21.

Displacement of the locking trigger 14 occurs when the end of the arm 11 strikes the trigger. The float 19 is thus not only retained in the position illustrated in Fig. 3, but is locked into this position by virtue of the closure of the central guide passage by means of the locking trigger 14. It is understood that this triggger 14 closes the central passage when the lower float 7 occupies the elevated position also shown in Fig. 3.

The master float arm 11 is pivoted at 30 at one side of the tank 1. A valve connecting rod 31 joins a plunger rod 32 with the master float arm 11. The rod 32 works in a stuffing box 33 in the top of the tank 1. A link 34 connects the rod 32 with one end of a rocker arm 35 which is pivoted in the center on a standard 36ª.

A ball and socket joint 36 connects the other end of the rocker arm 35 with a stem 37 which is carried between the ends of valve handles 38 and 39. Equalizing springs 40 are disposed on the stem 37 between the joint 36 and the respective handles 38.

The handle 38 controls a valve 41 in a pressure inlet pipe 42. The pipe 42 is introduced into the tank 1 through the top, where it is bent upon itself into the shape of a goose neck so that the orifice of the pipe is disposed adjacent to the top and above the level of the fluid in the tank. The handle 39 controls a valve 43 in a vent pipe 44.

In the normal position of the parts, the vent valve 43 is open and the pressure inlet valve 41 is closed. The sudden ascent of the master float 19 quickly shifts or reverses the positions of the respective valves, so that the vent valve 43 becomes closed and the pressure inlet valve 41 becomes open. This action occurs only when the tank 1 is almost completely filled and the upper float 22 acts upon the lower releasing trigger 18 in the manner previously pointed out.

Pressure, whether it be steam or compressed air, being admitted to the tank 1 through the pressure inlet pipe 42 above the fluid in the tank, forces the fluid out through the check valve 6, the inlet valve 5 automatically closing. As incidental features of construction, the tank 1 is provided with a drain cock 45 at the bottom and a manhole 46 at the top.

The automatic cut off illustrated in Fig. 7 is employed where high steam or air pressure is used, and may or may not be embodied with the mechanism of the trap described above. The pivoted float 47 is located in the tank 1 at right angles with the master float arm 11, and at the desired height according to the particular requirements.

In discharging the contents of the tank, the float 47 naturally recedes from the full line position to the dotted line position, pulling on a plunger rod 48 through the connecting rod 49 and closing a valve 50 in the pressure inlet pipe 42. The valve 50 is located above the valve 41 and has a valve handle to which the rod 48 is connected.

By means of the automatic cut off valve just described, the evacuating pressure entering the pipe 42 is cut off when the float 47 drops to a predetermined position. It will be understood that if the float 47 be located approximately midway of the tank 1, the cut off valve 50 will operate to cut off the evacuating pressure when the tank has been about half emptied. The expansion of the evacuating fluid is now intended to expel the remainder of the liquid in the tank.

The operation of the trap is thought to be fully understood from the foregoing description but a brief review thereof may be to advantage. The lifting trap is intended to be operated at a sufficient depth below the level of the fluid which is to be transferred, this depth being readily determined by actual experimentation.

The tank 1 is submerged in the liquid by attaching weights to the brackets 3 at the bottom. The trap is supported at the lifting lugs 2. The trap is now lowered into the liquid, whereupon the inlet valve opens and fluid commences to enter the tank. At this time the vent valve 43 is open and the pressure valve 41 is closed.

The lower float 7 rises causing the locking trigger 14 to bridge the central passage of the guide 10. The fluid level passes the master float 19 but the float 19 does not ascend with the fluid level because of the engagement of the releasing trigger 18 with the end of the master float arm 11. The level of the fluid reaching the upper float 22, causes the arm 23 to move on its pivot and shift the releasing trigger 18 from in front of the arm 11. The buoyancy of the master float 19 causes it to rapidly ascend until the end of the arm strikes the upper stop 21.

This same upward motion of the master float arm 11 reverses the positions of the valves 43 and 41, closing the vent valve and opening the pressure valve, so that pressure enters the interior of the tank 1 through the pipe 42. The automatic cut off valve 50 comes into play when the controlling float 47 recedes to a predetermined position with the receding fluid level which is now being acted upon by the pressure from the pipe 42.

In emptying the tank, the liquid level of course falls and when it reaches the lower float 7, the upper trigger 14 is moved out of engagement with the end of the master float arm 11 permitting the master float to drop to the normal lower position illustrated in Fig. 1, whereupon the valves 41 and 43 at the top are again reversed.

As incidental features of construction it should be pointed out, that instead of placing the springs 17 and 29 on the trigger rods 15 and 27 as shown, these springs may be made in the shape of coil springs fitted on the supporting bolt of the triggers with one end of the spring in engagement with the trigger and the other in engagement with the adjacent guide. In both cases the result is the same. Guides 10ª consisting simply of metallic brackets are secured to the adjacent portions of the guides and are slotted to permit the passage of the trigger rods 15 and 27.

It should also be observed, that instead of placing the vent and pressure valves on the outside as illustrated, they may be positioned on the inside, and similarly the operating parts now shown on the inside, may be positioned on the outside and work just as well.

While the construction and arrangement of the trap as illustrated and described is that of a generally preferred form, obviously modifications and changes may be made without departing from the spirit of the invention or the scope of the claims.

I claim:

1. In a lifting trap, a tank having a fluid inlet, a pressure inlet having a normally open cut-off valve and a normally closed pressure valve, a master float having a connection to the pressure valve for opening said valve when the tank is full, means for retarding the action of the master float until the tank is full, and means for automatically closing the cut-off valve when the fluid level in the tank has receded to a predetermined point under pressure from the pressure inlet, to cause the evacuation of the remainder of the fluid by the expansion above the fluid.

2. In a lifting trap, a tank having a fluid inlet, a vent pipe and a pressure inlet pipe at the top, a normally open valve in the vent pipe, a normally closed valve in the pressure pipe, valve arms, means including a resilient element, connecting the valve arms, a rocker arm and plunger connected to said means, the plunger extending into the tank, a master float inside of the tank and having a connection to the plunger, means for restraining the ascent of the master float with the rising fluid level in the tank, and an upper float having an operating connection to said means for releasing the master float and reversing the valves through the rocker arm and plunger connection, when the tank is full.

3. In a lifting trap, a tank, opposed channels spaced apart to form a vertical guide, supporting brackets for the channels including portions extending into the space and providing an upper and lower stop, a master float having a pivoted float arm with the end normally resting on the lower stop, a pivoted trigger adjacent to each stop, the lower trigger normally bridging the space and engaging the end of the arm, the upper trigger being normally disposed at one side of the space, a lower float pivoted to the guide, a connection between the lower float and the upper trigger including a resilient element, the lower float being adapted to move the upper trigger across the space with the rising of the fluid level in the tank, an upper float pivoted to the guide, a connection between the upper float and the lower trigger including a resilient element, the upper float being adapted to move the lower trigger from in front of the end of the arm when the tank is full, a pressure pipe leading into the tank at the top, and a normally closed valve in said pipe having a connection with the master float arm for opening said valve when the end of said arm is released by the lower trigger, to permit the entrance of the pressure into the tank above the liquid level.

4. A lifting trap, comprising a tank with a fluid inlet and outlet, a pair of spaced guides mounted in the tank, lugs providing mounting means for guides and stops therebetween, a pivoted master float arm having the end inserted between the guides and limited in movement by the stops, a float on the arm, a releasing trigger adjacent to the lower stop and holding the float arm in the lower position, float actuated means at the top of the tank retracting and releasing the trigger to release the master float when the fluid level reaches said upper float, a locking trigger pivoted adjacent to the upper stop, a lower float acting initially to move the locking trigger across the guides into the path of said arm, resilient means coöperating with said trigger to permit the passage of said arm into the upper position, a valved pressure inlet pipe, a valved vent pipe, connecting means between said valves and the master float arm for simultaneously reversing the valves on the release of the master float, to open the pressure valve and close the vent valve, and automatically acting means for subsequently shutting off the pressure independently of said pressure valve.

GEORGE RILEY CARTER.

Copies of this patent may be obtained for five cents each, by addressing the "Commissioner of Patents, Washington, D. C."